(12) United States Patent
Pagodinas et al.

(10) Patent No.: US 12,304,616 B2
(45) Date of Patent: May 20, 2025

(54) AIRCRAFT THRUST CONTROL SYSTEM

(71) Applicant: Kaunas University of Technology, Kaunas (LT)

(72) Inventors: Darijus Pagodinas, Kaunas (LT); Vytautas Dumbrava, Kaunas (LT)

(73) Assignee: Kaunas University of Technology, Kaunas (LT)

( * ) Notice: Subject to any disclaimer, the term of this patent is extended or adjusted under 35 U.S.C. 154(b) by 74 days.

(21) Appl. No.: 17/927,368

(22) PCT Filed: May 26, 2020

(86) PCT No.: PCT/IB2020/054978
§ 371 (c)(1),
(2) Date: Nov. 23, 2022

(87) PCT Pub. No.: WO2021/240211
PCT Pub. Date: Dec. 2, 2021

(65) Prior Publication Data
US 2023/0202643 A1    Jun. 29, 2023

(51) Int. Cl.
| | |
|---|---|
| *B64C 11/48* | (2006.01) |
| *B64C 27/20* | (2023.01) |
| *B64U 10/14* | (2023.01) |
| *B64U 30/20* | (2023.01) |
| *B64U 30/26* | (2023.01) |
| *B64U 50/11* | (2023.01) |
| *B64U 50/13* | (2023.01) |
| *B64U 50/14* | (2023.01) |

(Continued)

(52) U.S. Cl.
CPC .............. *B64C 11/48* (2013.01); *B64U 30/20* (2023.01); *B64U 50/13* (2023.01); *B64U 50/14* (2023.01); *B64U 50/18* (2023.01); *B64U 50/19* (2023.01); *B64C 27/20* (2013.01); *B64U 10/14* (2023.01); *B64U 30/26* (2023.01); *B64U 50/11* (2023.01)

(58) Field of Classification Search
CPC ........ B64C 11/48; B64U 30/296; B64U 10/16
See application file for complete search history.

(56) References Cited

U.S. PATENT DOCUMENTS

| | | | |
|---|---|---|---|
| 2016/0304193 A1 | 10/2016 | Marcel | |
| 2017/0253332 A1* | 9/2017 | Champagne, Jr. ..... | G05D 1/652 |
| 2017/0274984 A1* | 9/2017 | Beckman ................ | B64C 11/48 |

(Continued)

FOREIGN PATENT DOCUMENTS

| | | | | |
|---|---|---|---|---|
| CA | 3096122 A1 * | 10/2019 | ........... | B64C 39/024 |
| CA | 3042109 A1 * | 1/2020 | ............. | B64C 27/08 |

(Continued)

OTHER PUBLICATIONS

International Search Report and Written Opinion mailed Dec. 2, 2021 for PCT Application No. PCT/IB2020/054978.

*Primary Examiner* — Christopher P Ellis
(74) *Attorney, Agent, or Firm* — Koivula & Somersalo, LLC

(57) ABSTRACT

The aircraft thrust control system comprises a central power unit and peripheral power units. The central power unit comprises upper and lower propellers arranged one above the other and adapted to rotate in opposite directions, while propellers of the peripheral power units are located outside the aerodynamic operating range of the central power unit propellers.

8 Claims, 2 Drawing Sheets

(51) Int. Cl.
*B64U 50/18* (2023.01)
*B64U 50/19* (2023.01)

(56) References Cited

U.S. PATENT DOCUMENTS

2018/0029703 A1    2/2018  Simon
2020/0010193 A1*   1/2020  Alexander ............ B64C 39/024

FOREIGN PATENT DOCUMENTS

| CN | 109941429 | A |   | 6/2019  |             |
|----|-----------|---|---|---------|-------------|
| CN | 112441226 | A | * | 3/2021  | ............. B64C 27/20 |
| CN | 116654312 | A | * | 8/2023  |             |
| DE | 102005046155 | A1 |   | 4/2007  |             |
| FR | 3032687 | A1 | * | 8/2016  | ............. B64C 27/10 |
| FR | 3048956 | A1 | * | 9/2017  | ............. B64C 27/16 |
| FR | 3103463 | A1 | * | 5/2021  | ............. B64C 27/08 |
| KR | 20170018671 | A |   | 2/2017  |             |
| KR | 102308242 | B1 | * | 10/2020 |             |
| RU | 2803214 | C1 | * | 9/2017  |             |
| WO | WO-2016081041 | A1 | * | 5/2016  | ............. B64C 27/20 |
| WO | WO-2018103457 | A1 | * | 6/2018  | ............. B64C 27/08 |
| WO | WO-2019025918 | A1 | * | 2/2019  | ............. B64C 11/48 |
| WO | WO-2020002147 | A1 | * | 1/2020  | ............. A63H 27/12 |

* cited by examiner

AIRCRAFT THRUST CONTROL SYSTEM

TECHNICAL FIELD

The invention relates to electrically powered upward thrust aircraft, more particularly to unmanned aircrafts with main upward thrust propeller mechanism and additional directional control propeller mechanisms.

TECHNICAL LEVEL

Unmanned or manned aircrafts are rapidly gaining popularity not only in research or military fields but also in civilian applications. One of such aircrafts for transport of passengers or other cargo is a hybrid of a helicopter and a conventional flying drone with a central upward lifting thrust mechanism and auxiliary directional control propeller mechanisms. Such a system combines positive aerodynamic-energy characteristics of the helicopter's upward thrust and positive multi-propeller drone control principle when the control is performed by electrically differentiating (changing thrust) with the help of additional control thrust centers.

U.S. patent application Ser. No. 14/987,198 (publication No. US2016/0304193) discloses a multi-rotor flying vehicle having a longitudinal fuselage, a passenger compartment, front wings and rear wings. Each wing has a propeller mounted on a brushless electric motor for control of direction of movement of the aircraft. The central power unit for generating main upward thrust force comprises an aerodynamic tubular body, a brushless electric motor and a propeller. The central power unit for lifting or lowering the aircraft may comprise one propeller or two propellers rotating in opposite directions. The power units in the wings have tilting ability to control the direction of movement of the aircraft. Main disadvantage of this system is the gyroscopic and stabilizing effects created in both central and peripheral power units, making aircraft's control and movement difficult in the horizontal direction.

The present invention solves the drawbacks known in the art and provides additional advantages: it improves energy parameters of unmanned and manned aircrafts such as ratio of aerodynamic thrust and energy consumption of propellers, i.e. higher lifting power is generated with less energy consumption.

SUMMARY OF THE INVENTION

The aircraft thrust control system comprises an integral body (1), a central power unit (2) mounted in the central part of the integral body (1), and peripheral power units (3) mounted on branches (4) of the integral body (1). The central power unit (2) is a relatively high-power power unit, comprising one or more brushless or other type of motors and propellers (5.1, 5.2). One or more motors of the central power unit (2) are arranged on one axis, for example one above the other, and the propellers (5.1, 5.2) rotate in opposite directions. Peripheral power units (3) are relatively low power units compared to the central power unit (2). Each peripheral power unit (3) comprises at least one electric motor, such as a brushless electric motor, and at least one propeller (6.1, 6.2). The peripheral power units (3) are arranged on the branches (4) of the integral body (1), for example at their distal ends, with respect to the central part. Said branches (4) extend radially from the central axis of rotation of the propellers (5.1, 5.2) of the central power unit (2) and are outside of the aerodynamic operating zone of the said propellers (5.1, 5.2). All peripheral power units (3) are open-type units.

BRIEF DESCRIPTION OF DRAWINGS

Features of the invention are presented in the Claims. However, the invention may be best understood from the following detailed description of the invention, in which, without limiting the scope of the invention, exemplary embodiments of the invention are given in conjunction with the accompanying drawings, where:

Figure 1:
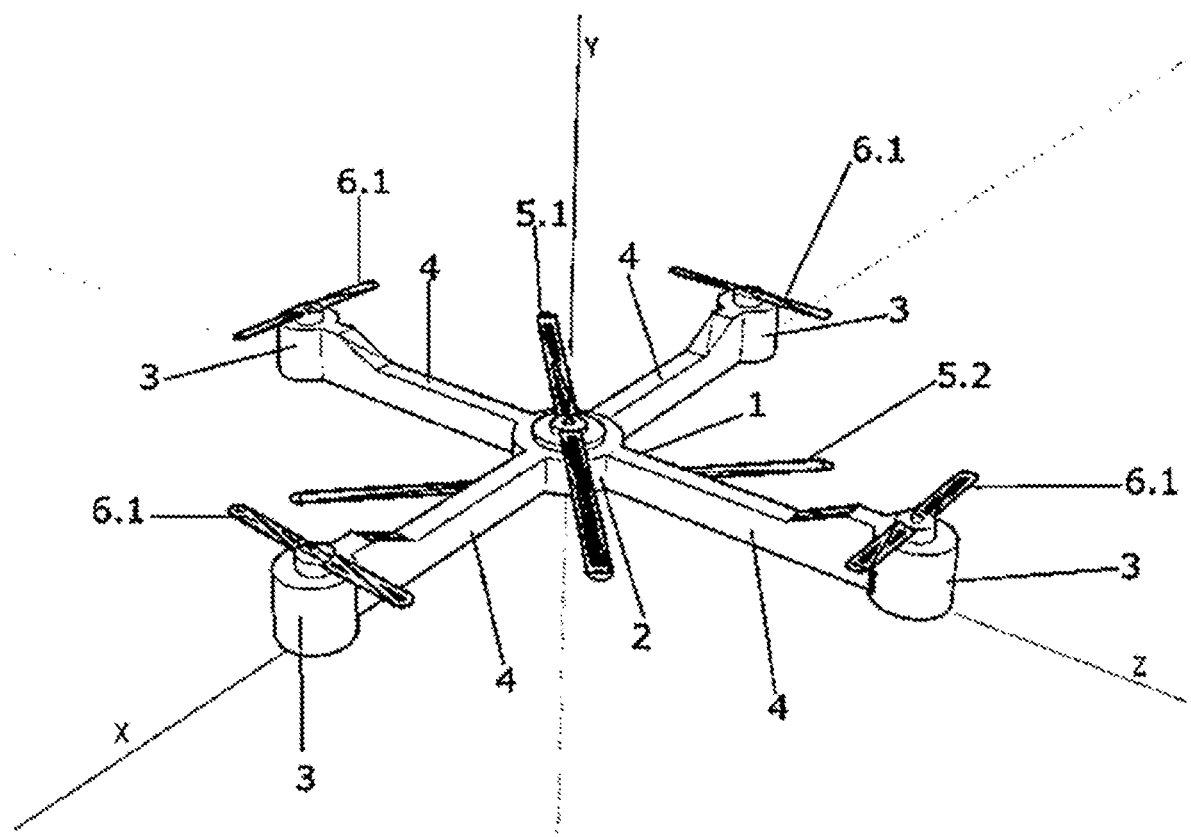
FIG. 1 shows embodiment of the aircraft thrust control system with an open central power unit and four open peripheral power units.

The most preferred embodiments of the invention are described below with reference to the drawings. Each figure shows the same numbering of the same or equivalent item.

DETAILED DESCRIPTION OF THE INVENTION

It should be understood that numerous specific details are set out in order to provide a complete and comprehensive description of the embodiment example of the invention. However, skilled person will understand that the level of details of embodiment examples does not limit the embodiment of the invention, which can be embodied without such specific instructions. Well-known methods, procedures and components have not been described in detail to make sure that embodiment examples are not misleading. Furthermore, this description should not be construed as limiting exemplary embodiments provided, but as an implementation thereof.

Although exemplary embodiments of the invention or aspects thereof, as illustrated and described, include many components that are depicted in a particular common space or location, some components may also be remote. It should also be understood that the examples given are not limited to the components described but also include other elements required for their functioning and interaction with other components, the existence of which is self-explanatory and therefore not detailed.

Terms:

"Aerodynamic operating zone"—areas at the top, bottom and sides of a propeller where the rotation of the propeller results in a gradient of the velocity of the airflow between the generated airflow and the ambient air mass.

"Integral" means produced by casting, printing or other similar means to obtain an integral body to which additional elements are mounted. It can also be assembled from individual components that are rigidly connected to each other.

An aircraft thrust control system comprises an integral body (1), a central power unit (2) mounted in a central part of the integral body (1), and peripheral power units (3) mounted on branches (4) of the integral body (1). The system also comprises other necessary electronic and mechanical components that are well known in the art and are designed to operate, control, and connect the system to the aircraft.

The central power unit (2) is a relatively high power engine comprising one or more brushless or other types of motors and propellers (5.1, 5.2). One or more motors of the central power unit (2) are arranged on one axis, for example one above the other, and the propellers (5.1, 5.2) rotate in opposite directions. The propellers (5.1, 5.2) are arranged so that one propeller (5.1), which is the upper one, rotates in a plane different from the plane of rotation of the second propeller (5.2), which is lower one, and parallel to it, and the motor or motors of the two propellers (5.1, 5.2) are located between these planes. The two propellers (5.1, 5.2) of the central power units allows allow full compensation of torsional reaction of the two propellers, i.e. no additional aerodynamic compensation measures are required. It also compensates (eliminates) gyroscopic moment, which is undesirable in view of the overall control of the aircraft.

Peripheral power units (3) are relatively low power units compared to the central power unit (2). Peripheral power units (3) are mainly designed to control the aircraft thrust control system with respect to horizontal axes of motion X and Z. Each peripheral power unit (3) comprises at least one electric motor, such as a brushless electric motor, and at least one propeller (6.1, 6.2). The peripheral power units (3) are arranged on the branches (4) of the integral body (1), for example at their distal ends, with respect to the central part. Said branches (4) extend radially from the central axis of rotation of the propellers (5.1, 5.2) of the central power unit (2) and are outside of the aerodynamic operating zone of the propellers (5.1, 5.2). All peripheral power units (3) are open-type with propellers (6.1, 6.2) having no side covers, such as an aerodynamic ducts.

According to one embodiment of the invention and as shown in FIG. 1, the aircraft thrust control system comprises an open central power unit (2) with at least one motor and two propellers (5.1, 5.2) arranged as described above and four open peripheral power units (3). Peripheral power units (3) have relatively low power compared to the central power unit (2). Peripheral power units (3) are mainly designed to control the aircraft thrust control system with respect to the horizontal axes of motion X and Z. Each peripheral power unit (3) comprises one electric motor, such as a brushless electric motor, and one propeller (6.1). The peripheral power units (3) are arranged on the branches (4) of the integral body (1), for example at their distal ends with respect to the central part. Said branches (4) extend radially from the central axis of rotation of the propellers (5.1, 5.2) of the central power unit (2) and are outside of the aerodynamic operating zone of the propellers (5.1, 5.2). All peripheral power units (3) are open-type with propellers (6.1) having no side covers, such as aerodynamic ducts. The propellers (6.1) of the peripheral power units (3) operate in essentially the same plane as the upper propeller (5.1) of the central power unit (2). These power units are arranged radially, at 90-degree angular intervals.

Figure 2:
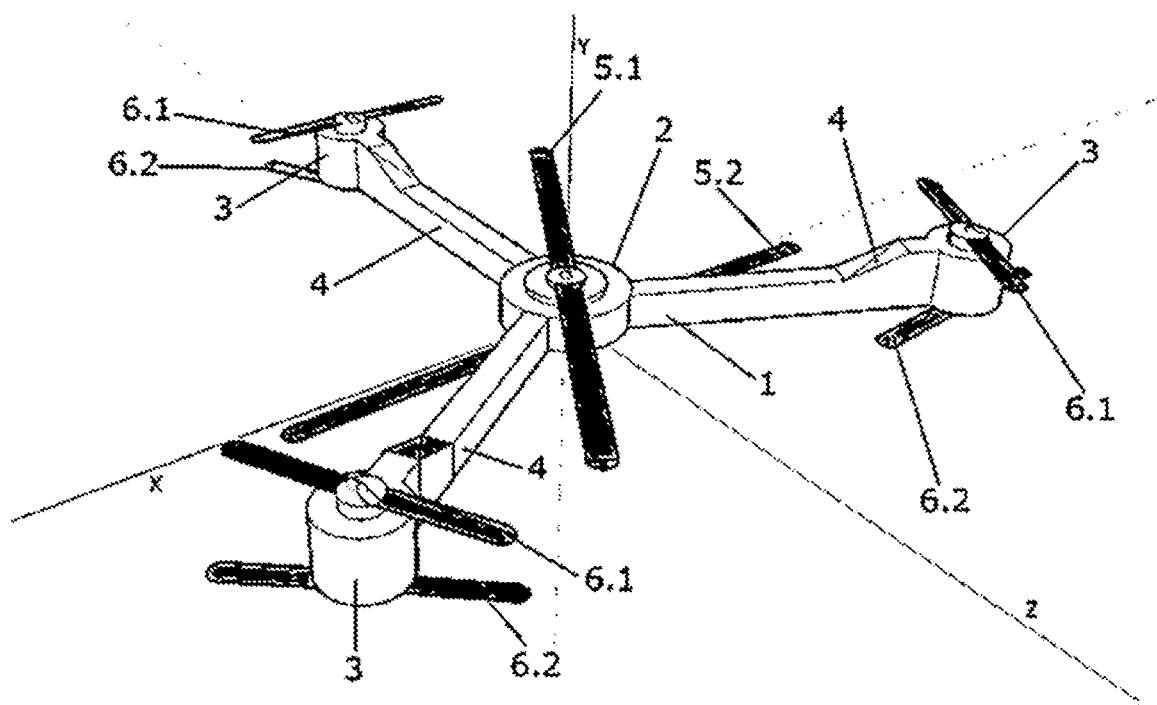
FIG. 2 shows embodiment of the aircraft thrust control system with an open central power unit and three open peripheral power units.

According another embodiment of the invention and as shown in FIG. 2, the aircraft thrust control system comprises the open central power unit (2) with at least one motor and two propellers (5.1, 5.2) arranged as described above, and three peripheral power units (3). The peripheral power units (3) are arranged on the branches (4) of the integral body (1), for example at their distal ends, with respect to the central part. Said branches (4) extend radially from the central axis of rotation of the propellers (5.1, 5.2) of the central power unit (2) and are outside of the aerodynamic operating zone of the propellers (5.1, 5.2). All peripheral power units (3) are open-type with propellers (6.1, 6.2) having no side covers, such as aerodynamic ducts. These power units are arranged radially, at 120-degree angular intervals. In order to aerodynamically compensate the three peripheral power units (3) with respect to the vertical axis of the aircraft, each of the three peripheral power units (3) is equipped with two electric motors of relatively very low power, one above the other, and propellers (6.1, 6.2) rotating in opposite directions. The propellers are arranged so that one propeller (6.1) rotates in one plane that is different from the plane of rotation of the second propeller (6.2). The motors of the propellers (6.1, 6.2) are arranged, for example, between such planes. The upper propellers (6.1) of the peripheral power units (3) operate in essentially the same plane as the upper propeller (5.1) of the central power unit (2). The lower propellers (6.2) of the peripheral power units (3) operate in essentially the same plane as the propeller (5.2) of the central power unit (2).

Figure 3:
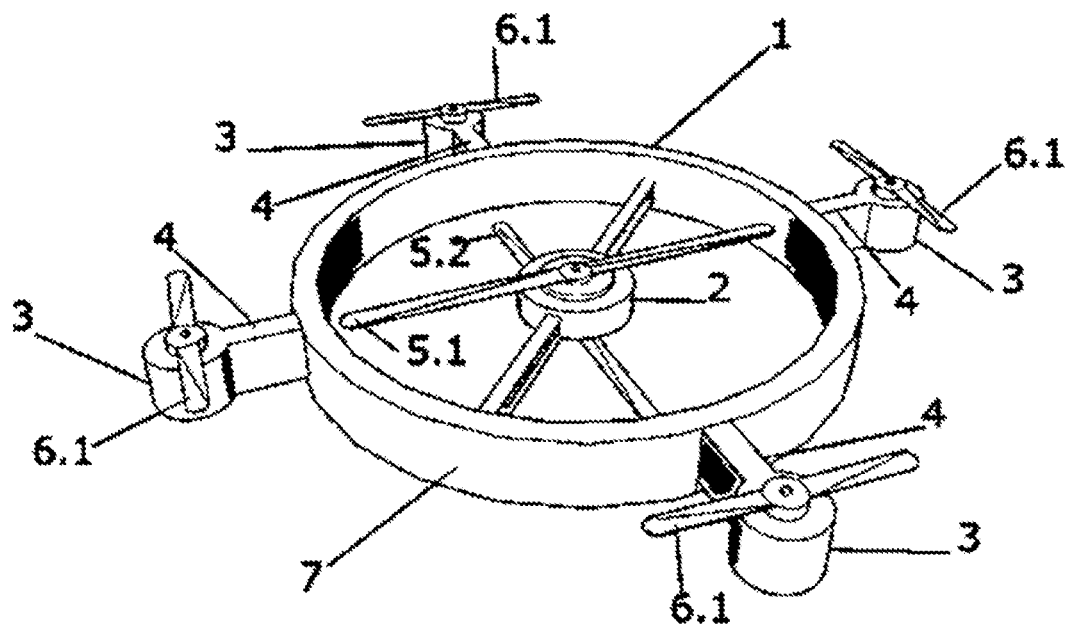
FIG. 3 shows embodiment of the aircraft thrust control system with a central power unit housed in an duct and four open peripheral power units.

According to yet another embodiment of the invention and as shown in FIG. 3, the aircraft thrust control system comprises the central power unit (2) housed in an aerodynamic duct (7) with at least one motor and two propellers (5.1, 5.2) arranged as described above and four open peripheral power units (3). Peripheral power units (3) have relatively low power compared to the central power unit (2). Peripheral power units (3) are mainly designed to control the aircraft thrust control system with respect to the horizontal axes of motion X and Z. Each peripheral power unit (3) comprises one electric motor, such as a brushless electric motor, and one propeller (6.1). The peripheral power units (3) are arranged on the branches (4) of the integral body (1), for example at their distal ends, with respect to the central part. Said branches (4) extend radially from the central axis of rotation of the propellers (5.1, 5.2) of the central power unit (2) and are outside of the aerodynamic operating zone of the propellers (5.1, 5.2). All peripheral power units (3) are open-type with propellers (6.1) having no side covers, such as aerodynamic ducts. The propellers (6.1) of the peripheral power units (3) operate in essentially the same plane as the upper propeller (5.1) of the central power unit (2). These power units are arranged radially, at 90-degree angular intervals.

Figure 4:
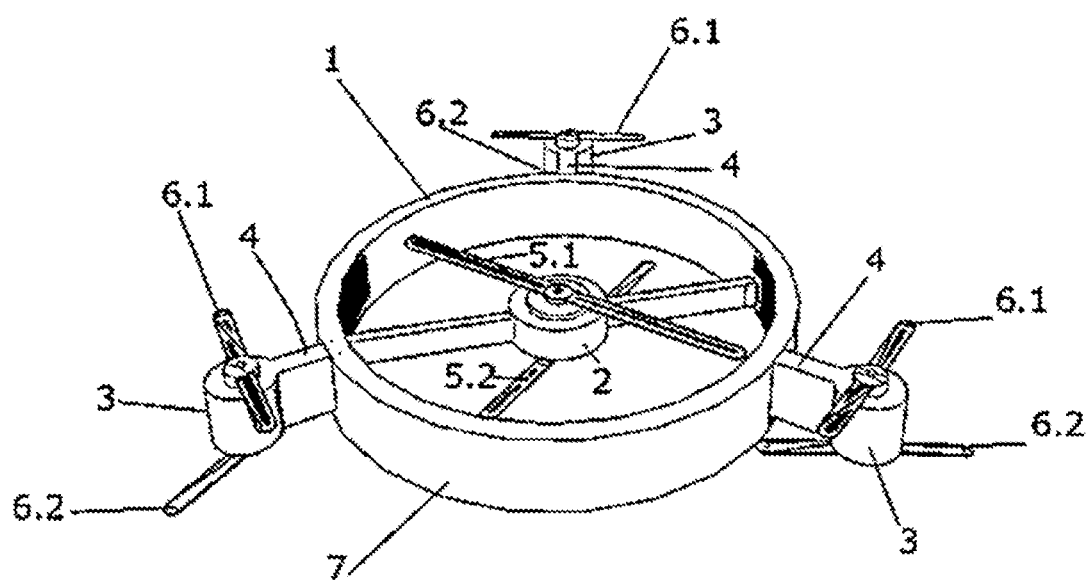
FIG. 4 shows embodiment of the aircraft thrust control system with a central power unit housed in an duct and three open peripheral power units.

According to yet another embodiment of the invention and as shown in FIG. 4, the aircraft thrust control system comprises the central power unit (2) housed in an aerodynamic duct (7) with at least one motor and two propellers (5.1, 5.2) arranged as described above, and three peripheral power units (3). The peripheral power units (3) are arranged on the branches (4) of the integral body (1), for example at their distal ends with respect to the central part. Said branches (4) extend radially from the central axis of rotation of the propellers (5.1, 5.2) of the central power unit (2) and are outside of the aerodynamic operating zone of the propellers (5.1, 5.2). All peripheral power units (3) are open-type with propellers (6.1, 6.2) having no side covers, such as aerodynamic ducts. These power units are arranged radially, at angular intervals of 120 degrees. In order to aerodynamically compensate the three peripheral power units (3) with respect to the vertical axis of the aircraft, each of the three peripheral power units (3) is equipped with two electric motors of relatively very low power, one above the other, and propellers (6.1, 6.2) rotating in opposite directions. The propellers are arranged so that one propeller (6.1) rotates in one plane that is different from the plane of rotation of the other propeller (6.2). The motors of the propellers (6.1, 6.2) are arranged, for example, between such planes. The upper propellers (6.1) of the peripheral power units (3) operate in essentially the same plane as the upper propeller (5.1) of the central power unit (3). The lower propellers (6.2) of the peripheral power units (3) operate in essentially the same plane as the propeller (5.2) of the central power unit (2).

In all embodiments of the invention, the central thrust power unit (2) is separated from the peripheral power units (3) so that: the central thrust power unit (2) is not involved at all in controlling the direction of movement of the aircraft thrust control system in the air. The purpose of the central power unit (2) is to create a higher or lower lifting force, thus obtaining better energy parameters of the main thrust. This effect is essentially achieved by using two propellers (5.1, 5.2) of the central power unit (2) rotating in different directions.

In all embodiments of the invention, the upper propeller (5.1) of the central power unit (2) and the upper propeller (6.1) of the peripheral power units (3) can be mounted at substantially the same level, approximately at a distance equal to the diameter of the upper propeller (5.1) of the central power unit from the end of the propeller (5.1). The lower propeller (5.2) of the central power unit (2) and the lower propellers (6.2) of the peripheral power units (3) can be mounted at substantially the same level, approximately at a distance equal to the diameter of the lower propeller (5.2) of the central power unit from the end of the propeller (5.2).

In all embodiments of the invention, the dimensions of the propellers (5.1, 5.2) of the central power unit (2) may be, for example:
- from 0.4 to 1.5 m in length for low lifting mass (5-60 kg) and low power (1 to 10 kW) upright thrust aircrafts. This category includes all unmanned vertical thrust aircrafts (electrocopters), including those intended only for vertical flight with an aerodynamic nozzle. Both the main thrust power unit and the control power units are powered by separate BLDC electric motors of different capacities, which can be powered by lithium polymer batteries.
- from 1.5 to 4 m in length for medium lifting mass (60-800 kg) and medium power (10 to 100 kW) vertical thrust aircrafts. This category includes both manned and unmanned upright thrust aircrafts (electrocopters). In this case, depending on the design and practical application, the main thrust power unit is driven either by high-power BLDC electric motors or (especially in cases where the power exceeds 50 kW) by an internal combustion engine (piston, Vankel type) or turbine low-power engine).
- >4 m in length for high lifting mass (>800 kg) and high power (>100 kW) upright thrust aircrafts. This category includes mainly manned aircrafts with more than 2 participants, but in some cases those may also be unmanned aircrafts of a relatively high lifting power. In this case, the main thrust power unit can no longer be electric due to excessive mass of high-capacity batteries, taking into account up-to-date technical possibilities; as a separate case, it can be electric when the power is supplied by wires and the aircraft operates only by vertical Y-axis, and very locally, (e.g., lifting or lowering loads in vertical direction with only slight horizontal shift). If the aircraft is intended for horizontal operation as well, the motors of main power unit must be internal combustion (piston, Vankel type) or turbine engines of appropriate power.

In all cases, when the power units (2, 3) are electrically powered BLDC electric motors and electronically controlled, they are powered by batteries of appropriate capacity. In cases where the central power unit (2) is not based on electric motors, the batteries of the peripheral power units (3) are recharged throughout the flight using the energy of the central power unit (2) motor (e.g. internal combustion engine) by rotating the generator (alternator) of the corresponding power.

When selecting the power of the electric motors of the peripheral power units (3) and thus the diameter of the propellers (6.1, 6.2), the main criterion is generation of the required mechanical torque M to tilt the aircraft with respect to the X and Z axes. The moment, respectively, is a product of the thrust force Ftr. generated by the thrust power unit and the arm L:

$$M = Ftr \times L$$

This depends on the moment of force generated by the mass and inertia of the aircraft and the gyroscopic moments, if any. As a result, the distance of the peripheral power units (3) from the center of mass and the thrust force generated by the power units, and thus the diameter of the propellers (6.1, 6.2) must be calculated separately in each case. In all embodiments of the invention, when the aircraft thrust control system is installed in the aircraft structure, the aircraft body, or cargo, must be located below the control system. This arrangement creates a situation where the center of gravity of the thrust is above the center of gravity of the aircraft, which makes the whole system self-stable with respect to the center of gravity during flight.

In all embodiments of the invention, the direction of movement of the aircraft thrust control system in the air is controlled by varying the rotational speeds of the propellers (6.1, 6.2) of the peripheral power units (3.1, 3.2).

The central power units (2.1, 2.2) arranged in this way generate about 90% of the upright thrust of the thrust control system. Peripheral power units (6.1, 6.2) arranged in this way generate about 10% of the upright lift of the thrust control system. Thrust distribution percentages are calculated from the total thrust, or the total lifting mass of the aircraft.

Although the present description includes numerous characteristics and advantages of the invention together with structural details and features, the description is given as an example of the invention embodiment. There may be changes in the details, especially in the form, size and layout of materials without departing from the principles of the invention, in accordance with the widely understood definition of terms used in claims.

The invention claimed is:
1. A thrust control system of an aircraft comprising:
   an integral body comprising a central portion and a plurality of branches having longitudinal axes that substantially intersect said central portion;
   an open-type central power unit configured to only control a lift of the aircraft, and open-type peripheral power units configured to control direction of movement of the aircraft, wherein
   the central power unit comprises an upper and a lower propeller arranged one above the other and adapted to rotate in opposite directions, and
   each of the peripheral power units comprising upper and lower propellers and the peripheral power units are located outside an aerodynamic operating range of the upper and lower propellers of the central power unit,
   wherein the upper propeller of the central power unit is provided in substantially the same plane as the upper propellers of the peripheral power units, and the lower propeller of the central power unit is provided in substantially the same plane as the lower propellers of the peripheral power units.

2. The aircraft thrust control system according to claim 1, wherein the system comprises four peripheral power units.

3. The aircraft thrust control system according to claim 1, wherein the system comprises three peripheral power units, wherein the upper propeller of each peripheral power unit is adapted to rotate in the opposite direction than the lower propeller of the power unit.

4. The aircraft thrust control system according to any one of the preceding claims, wherein the upper propeller of the central power unit and the upper propellers of the peripheral power units are adapted to operate approximately at a distance equal to the diameter of the upper propeller of the central power unit from end of the propeller, and wherein the lower propeller of the central power unit and the lower propellers of the peripheral power units are adapted to operate approximately at a distance equal to the dimeter of the lower propeller of the central power unit from the end of the propeller.

5. The aircraft thrust control system according to claim 1, wherein the length of the propellers of the central power unit is from 0.4 to 1.5 m.

6. The aircraft thrust control system according to claim 1, wherein the length of the propellers of the central power unit is from 1.5 to 4 m.

7. The aircraft thrust control system according to claim 1, wherein the length of the propellers of the central power unit is greater than 4 m.

8. The aircraft comprising the aircraft thrust control system according to claim 1.

* * * * *